3,611,721
FUEL CONTROL SYSTEM FOR GAS
TURBINE ENGINES
Richard J. Ifield, Beecroft, New South Wales, Australia, assignor to Joseph Lucas (Industries) Limited, Birmingham, England
Filed June 17, 1969, Ser. No. 833,918
Claims priority, application Great Britain, June 24, 1968, 29,923/68
Int. Cl. F02c 9/10
U.S. Cl. 60—39.28                                11 Claims

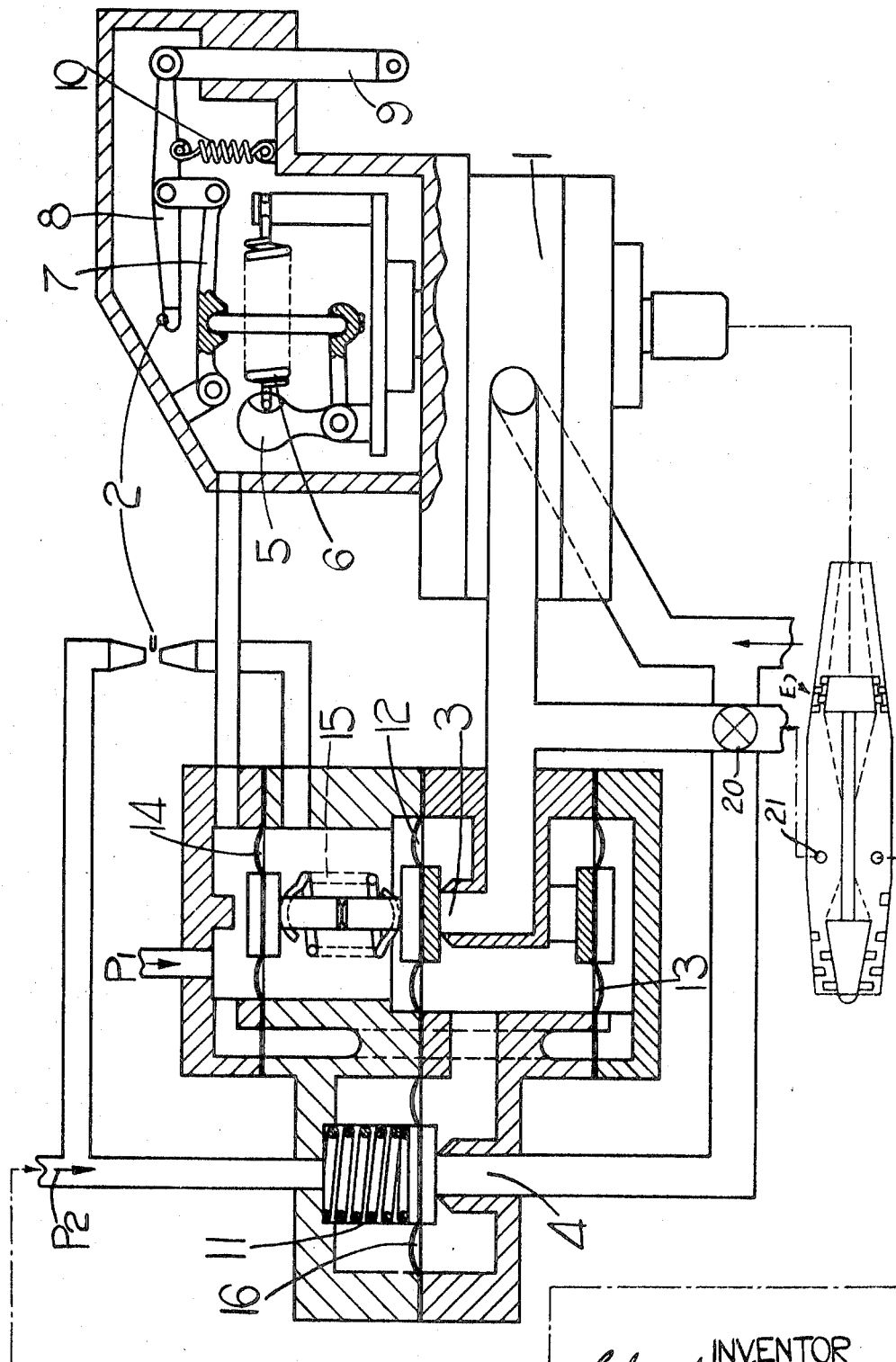

ABSTRACT OF THE DISCLOSURE

A system for controlling the fuel supply to a gas turbine engine in which a pair of valves is connected in series between the inlet and outlet of the associated fuel pump defining a pressure control device actuable by compressed air so as to spill fuel delivered by the pump to regulate the pressure at which fuel is supplied to the burners in accordance with the pressure of air derived from the compressor.

A governor mechanism, which in use, is driven at a speed proportional to engine speed includes an air pressure modifying device for modifying the air pressure applied to the pressure control device in accordance with the desired and actual speeds of the engine to cause the fuel pressure to approach a value such that engine will run at the desired speed.

The first valve of the pair is urged to open by pressure derived from the compressor intake and to close by pressure from the compressor output. The second valve is urged closed by pressure derived from the compressor output and to open by the pressure of the fuel upon which it operates.

The first valve is controlled by a pair of coupled diaphragms of equal area defining therebetween a volume to which fuel passing through the valve is admitted, with the remote sides of the diaphragms being acted upon by the pressure from the compressor intake and compressor output respectively. A third diaphragm of less area than either of the pair of diaphragms is resiliently coupled to one of said pair with which it cooperates to define a volume to which the pressure of the compressor outlet is admitted with the remote side of the third diaphragm being subjected to the pressure from the compressor intake.

BACKGROUND OF THE INVENTION

This invention relates to a fuel control system for a gas turbine engine and has as an object to provide such a system in a convenient form.

SUMMARY OF THE INVENTION

A system in accordance with the invention comprises a pump for supplying pressurized fuel to the burners of the engine, a pressure control device actuable by compressed air derived from the compressor of the engine for spilling fuel to regulate the pressure at which fuel is supplied to the burners in accordance with the pressure of air derived from the compressor, and a governor mechanism which, in use, is driven at a speed proportional to the engine speed, said governor mechanism including an air pressure modifying device which modifies the air pressure applied to the fuel pressure control device in accordance with the desired and actual speeds of the engine to cause the fuel pressure to approach a value such that the engine will run at the desired speed.

BRIEF DESCRIPTION OF THE DRAWINGS

An example of the invention is shown in the accompanying drawing which is a diagrammatic illustration of the fuel system.

DETAILED DESCRIPTION OF THE INVENTION

In the example shown the system includes a fixed displacement pump 1 which is driven, in use, at a speed proportional to the engine speed. The outlet port of the pump is connected via a shut-off cock 20 to the burners 21 of the engine E to be controlled.

For regulating the pressure at which fuel is supplied to the burners there is a fuel pressure control device incorporating a pair of valves 3, 4 in series controlling spill of fuel from the pump outlet. The valve 3 is controlled by a pair of diaphragms 12, 13 of equal area connected together to move a single unit, and a diaphragm 14 connected to diaphragm 12 and 13 in opposite directions so that the opening of the valve 3 is independent of fuel pressure. One side of diaphragm 13 and the opposite side of diaphragm 14 are acted upon by air pressure derived from the inlet of the compressor of the engine. The remaining side of diaphragm 12 and the remaining side of diaphragm 14 are acted upon by a pressure P2 derived from the compressor output pressure but modified by an air pressure modifying device 2 to be described hereinafter. The device 2 can vary the pressure applied as aforesaid between the compressor intake pressure value and substantially the full compressor output value. The valve 4 is controlled by diaphragm 16 acted upon on one side by the fuel pressure and on the other side by the pressure derived from the compressor output. Rising fuel pressure causes opening of valve 4 while rising compressor output pressure causes closing of the valve 4. A spring 11 urges the valve 4 towards a closed position.

The system also includes a governor mechanism driven by the pump shaft. This governor mechanism incorporates one or more rotary weights 5 which is or are spring loaded inwardly by means of a spring or springs 6. The weight 5 is coupled to a movement magnifying lever 7 which is in turn linked to a second movement magnifying lever 8. The lever 8, is, in fact, coupled to the lever 7 intermediate its ends and is coupled at one end to a throttle link 9. A spring 10 acts on the lever 8 between its points of connection to the lever 7 and to the link 9. The opposite end of the lever 8 forms a blade which controls a kinetic nozzle forming the air pressure modifying device 2. The arrangement of the linkage is such that for a given setting of the link 9 the position of the blade relative to the kinetic nozzle is determined by the rate at which the governor weights are rotated. Increasing engine speed causes movement of the blade on the lever 8 to deflect a greater proportion of the air flow between the nozzles of the kinetic nozzle, the lever 8 pivoting about the axis of its connection to the link 9. Similarly for a given engine speed movement of the link 9 to demand an increased engine speed causes pivoting of the lever 8 about the axis of its coupling to the lever 7 to withdraw the blade from between the nozzles of the kinetic nozzle 2.

The valve 4 determines the minimum fuel pressure in accordance with the compressor delivery pressure. As the compressor delivery pressure rises the pressure of fuel supplied to the burners will rise correspondingly. In normal steady running conditions the actual pressure of fuel supplied to the burners will be higher than this minimum pressure by an amount determined by the position, for the time being, of the valve 3 and the rate of flow of fuel through the spill circuit. The position of valve 3 is in turn determined by the relationship between the desired and actual speeds of the engine and the prevailing compressor intake pressure. Rising compressor intake pressure will tend to open valve 3 thereby decreasing the pressure at which fuel is supplied to the burners. If the engine speed is in excess of the desired speed the pressure acting to separate diaphragms 12, 13 will fall to a minimum value substantially equal to the compressor intake pressure and valve 3 will open. As the engine speed approaches the desired speed the pressure acting to separate diaphragms 12, 14 will rise and, owing to the difference in area between the diaphragms 12, 14 will apply a net force to the valve 3 to tend to close the latter. When the engine speed is slightly lower than the desired speed the pressure tending to separate the diaphragm 12, 14 will rise still further thereby further restricting the spillage of fuel and increasing the pressure at which fuel is supplied to the burner.

During acceleration the kinetic nozzle 2 is opened completely so that the pressure in the chamber between the diaphragms 12, 14 is substantially equal to the compressor delivery pressure. This high pressure has the effect of separating the diaphragms 12, 14 against the effect of the spring 15 and the diaphragm 14 is urged against a stop. The position of the valve member 3 is now determined by the compressor intake pressure and the compressor delivery pressure with a position feed back signal applied by the spring 15. Thus the characteristic of the flow control valve is different during acceleration from the characteristic during normal steady running.

Having thus described my invention what I claim as new and desire to secure by Letters Patent is:

1. A fuel control system for a gas turbine engine comprising a pump for supplying pressurized fuel to the burners of the engine, a pressure control device actuable by compressed air derived from the compressor of the engine for spilling fuel to regulate the pressure at which fuel is supplied to the burners in accordance with the pressure of air derived from the compressor, and a governor mechanism which, in use, is driven at a speed proportional to the engine speed, said governor mechanism including an air pressure modifying device which modifies the air pressure applied to the fuel pressure control device in accordance with the desired and actual speeds of the engine to cause the fuel pressure to approach a value such that the engine will run at the desired speed.

2. A system as claimed in claim 1 in which the pressure control device comprises first and second valves in series between the pump inlet and outlet.

3. A system as claimed in claim 2 in which the air pressure applied to the control device includes a first pressure derived from the compressor intake, and second and third pressures derived from the compressor output.

4. A system as claimed in claim 3 in which the said third pressure is regulated by the air pressure modifying device.

5. A system as claimed in claim 3 in which the said first valve is urged to open by the said first pressure and to close by the said third pressure.

6. A system as claimed in claim 5 in which the said second valve is urged to shut by the said second pressure and to open by the pressure of the fuel upon which it operates.

7. A system as claimed in claim 5 in which the said first valve is controlled by a pair of coupled diaphragms of equal area and defining between their adjacent sides a volume to which fuel passing, in use, through the valve is admitted, the remote sides of the diaphragms being acted upon by the said first and third pressures respectively.

8. A system as claimed in claim 7 in which a third diaphragm having an area less than either of the said pair of diaphragms is resiliently coupled to one of the said pair of diaphragms with which it combines to define a volume to which in use the said third pressure is admitted, the remote side of the said additional diaphragm being subjected, in use, to the said first pressure.

9. A system as claimed in claim 2 in which the said air pressure modifying device comprises a kinetic nozzle controlled by a movable blade.

10. A system as claimed in claim 9 in which the blade is movable by means responsive to the relationship between the desired and actual engine speeds.

11. A system as claimed in claim 10 in which the said responsive means comprises a lever coacting both with a governor mechanism driven at a speed proportional to the engine speed and with a link to the engine throttle control.

References Cited
UNITED STATES PATENTS

| | | | |
|---|---|---|---|
| 2,947,141 | 8/1960 | Russ | 60—39.28 |
| 3,123,128 | 3/1964 | Zeisloft | 60—39.28 X |
| 3,213,613 | 10/1965 | Schwent et al. | 60—39.28 |
| 3,267,670 | 8/1966 | McCombs, Jr. | 60—39.28 |
| 3,438,199 | 4/1969 | McGinnis et al. | 60—39.28 |
| 3,475,908 | 11/1969 | Warne | 60—39.28 |

AL LAWRENCE SMITH, Primary Examiner